United States Patent [19]

Ogiwara

[11] 4,363,884
[45] Dec. 14, 1982

[54] FRICTION MATERIAL

[75] Inventor: Osao Ogiwara, Hanyu, Japan

[73] Assignee: Akebono Brake Industry Company, Ltd., Tokyo, Japan

[21] Appl. No.: 244,788

[22] Filed: Mar. 17, 1981

[30] Foreign Application Priority Data

Mar. 17, 1980 [JP] Japan ................................ 55-33581
Mar. 17, 1981 [JP] Japan ................................ 55-33582

[51] Int. Cl.$^3$ ............................................. C08L 63/00
[52] U.S. Cl. ..................................... 523/156; 523/155; 523/445; 523/451; 524/405; 524/417
[58] Field of Search ............. 260/38, 39, 37 EP, 17.2, 260/19 R, 998.13, DIG. 39; 188/251 R, 251 A, 251 M; 523/155, 156, 445, 451; 524/405, 417

[56] References Cited

U.S. PATENT DOCUMENTS

| | | | |
|---|---|---|---|
| 2,867,125 | 1/1959 | Glover | 260/998.13 |
| 3,007,890 | 11/1961 | Twiss et al. | 260/998.13 |
| 3,766,130 | 10/1973 | Johnson | 260/998.13 |
| 3,891,595 | 6/1975 | Birchall | 260/38 |
| 3,932,568 | 1/1976 | Watts et al. | 260/38 |
| 4,119,591 | 10/1978 | Aldrich | 260/17.2 |
| 4,278,584 | 7/1981 | Noguchi et al. | 260/998.13 |
| 4,280,935 | 7/1981 | Ogiwara | 260/37 N |

FOREIGN PATENT DOCUMENTS 2844537 4/1979 Fed. Rep. of Germany ......................... 260/998.13

*Primary Examiner*—Lewis T. Jacobs
*Attorney, Agent, or Firm*—Armstrong, Nikaido, Marmelstein & Kubovcik

[57] ABSTRACT

In a non-asbestos friction material comprising ferrous metal particle and/or ferrous metal fiber, organic dust, inorganic substance, lubricant, metal powder, fibrous reinforcing material and thermosetting resin, the friction material being characterized in containing 0.01–5.0 wt. % of at least one material selected from the group consisting of boric acid, borate, phosphoric acid and phosphate as an anticorrosive component. Further, in the non-asbestos friction material containing rubber, organic friction dust, inorganic powder, lubricant, non-ferrous metal powder and/or non-ferrous fiber, fibrous reinforcing material, thermosetting resin and other friction material, the friction material characterized in containing at least one material selected from the group consisting of boric acid, borate, phosphate acid and phosphate as an anti-corrosive component and containing no ferrous component.

2 Claims, 4 Drawing Figures

FRICTION MATERIAL

SUMMARY OF THE INVENTION

In a non-asbestos friction material comprising 5-60 wt.% of ferrous metal particle and/or ferrous metal fiber, 0.5-15 wt.% of organic dust such as cashew dust and rubber dust, 2-20 wt.% of inorganic substance powder such as barium sulfate, calcium sulfate, calcium silicate and calcium carbonate, 5-25 wt.% of lubricant such as graphite and molybdenum disulfide, 0-20 wt.% of metal powder such as copper, brass and aluminum, 0-20 wt.% of fibrous reinforcement material comprising at least one material selected from the group consisting of organic and inorganic fibers and 3-15 wt.% of thermosetting resin binder such as phenol, melamine and epoxide, the friction material is characterized in containing 0.01-5.0 wt.% of at least one material selected from the group consisting of boric acid, borate, phosphoric acid and phosphate as an anticorrosive component. Further, in the non-asbestos friction material containing rubber dust, rubber binder or other materials involving sulfur or halogen elements and comprising 0.5-20 wt.% of organic friction dust, 5-60 wt.% of inorganic powder, 0-10 wt.% of lubricant, 0-30 wt.% of non-ferrous metal powder and/or non-ferrous fiber, 5-60 wt.% of fibrous reinforcement material comprising at least one material selected from the group consisting of organic or inorganic fibers, 0-20 wt.% of thermosetting resin binder such as phenol, melamine and epoxide, and other friction modifer, the friction material is characterized in containing at least one material selected from the group consisting of boric acid, borate, phosphoric acid and phosphate as an anticorrosive component and in containing no ferrous component.

Figure 1:
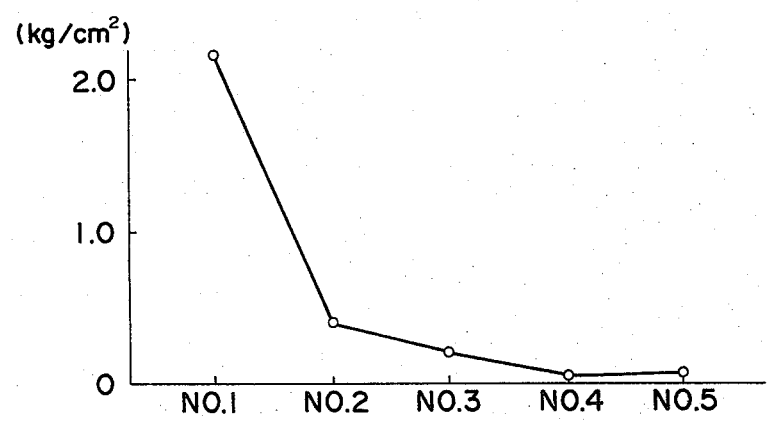
FIGS. 1 and 2 are graphs comparing the adherence forces between the comparison product and the invented products in Examples 1 and 2 of the first embodiment of this invention.

Ordinate: Adherence force (kg/cm$^2$).
Abscissa: Specimen No.

DETAILED DESCRIPTION OF THE INVENTION

The present invention relates to a non-asbestos friction material which decreases rust-forming and adherence of the friction material. The non-asbestos friction material contains ferrous metal particle and/or ferrous metal fiber and is formed with thermosetting resin binder.

The present invention further relates to a non-asbestos friction material which is particularly effective for decreasing rust-forming and adherence of the friction material during parking, wherein the non-asbestos friction material comprises rubber material or other materials containing sulfur or halogen elements.

In the friction materials used in vehicles and other industrial machineries, the friction materials normally come in contact with the opposite materials, for instance, during parking of the vehicles and are pressed against the opposite materials with high pressure, particularly in case of parking brakes and clutch facings.

On the other hand, the opposite materials are generally composed of ferrous metal, and the friction materials are liable to adhere to the opposite materials if rust is formed during contact, thereby increasing the adherence between the two and providing a worsened driving condition and may cause a non-operative condition.

In order to counter the rust and adherence in the conventional asbestos friction material, it has been considerably effective to maintain the friction material in alkalinity, and thus a weakly alkaline material has been added to the composition of the friction material.

The above asbestos friction material provides a flexibility because of the soft structure of asbestos, such flexibility is necessary in the brake linings and clutch facings. In contrast thereto, the non-asbestos friction material of this invention is required to provide the flexibility by other means because it does not comprise the asbestos reinforcement material which has a soft structure.

Accordingly, the non-asbestos friction material has been used with larger amounts of rubber dust and rubber binder than the the conventional asbestos friction material in order to provide the flexibility. These rubbers contain sulfur components as vulcanizing agent and halogen elements as halogenated rubber.

Under these circumstances, the inventor has made various studies in the compounding of ingredients for not lowering the friction performance of the friction material and reducing the rust-forming and adherence to a small quantity with respect to the non-asbestos friction material containing ferrous metal and, further, with respect to the non-asbestos friction material used with rubber material or other materials involving sulfur or halogen elements and comprised of no ferrous metal. The inventor attained the following first and second embodiments of this invention.

Incidentally, the conventional measure of maintaining alkalinity to reduce rust-forming and adherence was proved to be less effective for the non-asbestos friction material containing ferrous metal, which has been noted today as lacking asbestos and promising higher performance, and which is particulary ineffective in the areas of high temperature and high humidity and in the regions of damage from salt and a more ozone at the seaside.

The inventor has studied various compounding ingredients to solve these problem and obtained the first embodiment of this invention.

The First Embodiment

In the non-asbestos friction material containing the ferrous metal particle and/or ferrous metal fiber which is formed with the thermosetting resin binder, friction materials with various compounding ingredients added thereto were subject to a friction performance test and a rust-forming test. As a result, it was discovered that boric acid, phosphoric acid or salts thereof are particularly preferable as a material having stable effect. The friction material of this invention is characterized by containing at least 0.01 wt.% of boric acid etc. aforesaid, but the content thereof is preferably 0.01-10.0 wt.%, more particularly 0.01-6 wt.%.

The friction material of the first embodiment is excellent in reducing rust-forming and adherence in the non-asbestos friction material which has been noted as lacking asbestos and a promising high performance, and therefore is expected to take an important part for the measure for preventing rust-forming and adherence at stoppage and during parking, when it is used for vehicles and industrial machineries.

The first embodiment of the invention will be described in details with the reference of examples as follows.

EXAMPLE 1

Respective materials of the compounding composition (wt.%) indicated in No. 1-5 specimens of Table 1 were mixed sufficiently by the mixer and then formed under heating and pressure at a temperature of 150° C. and a pressure of 170 kg/cm$^2$. The obtained product were subject to the rust-forming and adherence test.

TABLE 1

| Specimen No. | 1 | 2 | 3 | 4 | 5 |
|---|---|---|---|---|---|
| Ferrous metal | 40 | 40 | 40 | 40 | 40 |
| Cashew dust | 5 | 5 | 5 | 5 | 5 |
| Calcium sulfate | 10 | 10 | 10 | 10 | 10 |
| Graphite | 15 | 15 | 15 | 15 | 15 |
| Copper powder | 10 | 10 | 10 | 10 | 10 |
| Aluminosilicate fiber | 10 | 10 | 10 | 10 | 10 |
| Phenol resin | 10 | 10 | 10 | 10 | 10 |
| Boric acid (borate) | — | 0.05 | 2 | 4 | 6 |

The rust-forming and adherence tests were performed in accordance with JASO C444-78 "The Rust-Forming Test Method". Test results were indicated in FIG. 1 plotted with an ordinate of adherence (kg/cm$^2$) and an abscissa of No. 1-5 specimens.

From the test results, it is observed that the No. 2-5 specimens of the Example 1 of the first embodiment were conspicuously effective in the reduction of the rust-forming and adherence in comparison with the No. 1 specimen of the comparison product.

EXAMPLE 2

Figure 2:
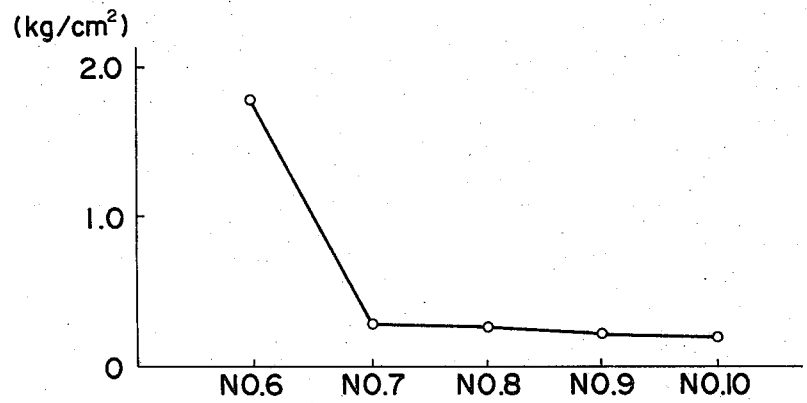

As to No. 6-10 specimens of Table 2, the specimen products were made in the same manner as in the Example 1 and were subject to the rust-forming and adherence tests. The test results were indicated in FIG. 2.

TABLE 2

| Specimen No. | 6 | 7 | 8 | 9 | 10 |
|---|---|---|---|---|---|
| Ferrous metal | 40 | 40 | 40 | 40 | 40 |
| Rubber dust | 5 | 5 | 5 | 5 | 5 |
| Barium sulfate | 15 | 15 | 15 | 15 | 15 |
| Graphite | 10 | 10 | 10 | 10 | 10 |
| Copper powder | 10 | 10 | 10 | 10 | 10 |
| Carbon fiber | 15 | 15 | 15 | 15 | 15 |
| Phenol resin | 10 | 10 | 10 | 10 | 10 |
| Phosphoric acid (phosphate) | — | 0.05 | 2 | 4 | 6 |

From the test results, it is observed that the No. 7-10 specimens of the Example 2 of the first embodiment were conspicuously effective in the reduction of the rust-forming and adherence in comparison with the No. 6 specimen of the comparison product.

Secondly, the friction materials used with the rubber material or other materials comprising sulfur or halogen elements have rusted the opposite ferrous plates or the ferrous components of the friction materials rapidly, thereby causing the adherence phenomenon mentioned above.

The inventor has examined the method of maintaining the non-asbestos friction material in alkalinity as the measure to counter the rust-forming and adherence, and found that the alkaline treatment deteriorates the rubber component greatly, which results in a loss of flexibility and a defect of forming cracks on the friction surfaces under a severe condition of use, and which has been useless with respect to rust in some conditions, since the rust-forming force of sulfur and halogen elements is large.

Thus, the inventor has made various researches in preventing the rust-forming of the non-asbestos friction material by means of removing the ferrous component in the non-asbestos friction material and, at the same time, effectively obtaining the compounded interests of lowering the adherence due to sulfur and halogen elements without reducing the friction performance, and attained the following second embodiment of the invention.

The Second Embodiment

In order to obtain effective ingredients of preventing the adherence mentioned above, the rust-forming test and performance test were performed on various materials and, with a result, boric acid, borate, phosphoric acid and phosphate were selected as most effective ingredients.

As aforementioned, the friction material of the second embodiment of the invention provides a composition of friction material excellent in preventing rust-forming and adherence of the non-asbestos friction material, which has been noted as lacking asbestos and a high performance, and is expected to play an important part in the measure to counter the rust-forming and adherence at stoppage and during parking, when it is used for the vehicles and the industrial machineries.

The second embodiment of the invention will be described in details with the reference of example as follows.

EXAMPLE 3

The specimens were made of a basic composition comprising nitrile rubber (NBR) as rubber binder comprising sulfur, cashew dust as organic dust, barium sulfate as inorganic powder, graphite as lubricant, carbon fiber as organic fiber, aluminosilicate fiber as inorganic fiber, copper powder as non-ferrous metal and phenol resin as thermosetting resin which was mixed sufficiently by mixer to dissolve the rubber binder with methyl ethyl ketone, and then subjected to a preliminary forming and formed in a heated metal mold with pressure after drying. The comparison between the basic specimen and the No. 1-4 specimens of the second embodiment according to the basic composition was indicated in Table 3. The figures are presented at wt.%.

TABLE 3

| Specimen No. | Basic composition | 1 | 2 | 3 | 4 |
|---|---|---|---|---|---|
| NBR | 10 | 10 | 10 | 10 | 10 |
| Cashew dust | 5 | 5 | 5 | 5 | 5 |
| Copper powder | 10 | 10 | 10 | 10 | 10 |
| Barium sulfate | 30 | 30 | 30 | 30 | 30 |
| Graphite | 2 | 2 | 2 | 2 | 2 |
| Carbon fiber | 5 | 5 | 5 | 5 | 5 |
| Aluminosilicate | 30 | 30 | 30 | 30 | 30 |
| Phenol resin | 8 | 8 | 8 | 8 | 8 |
| Boric acid (borate) | — | 0.05 | 3 | 6 | 9 |

Figure 3:
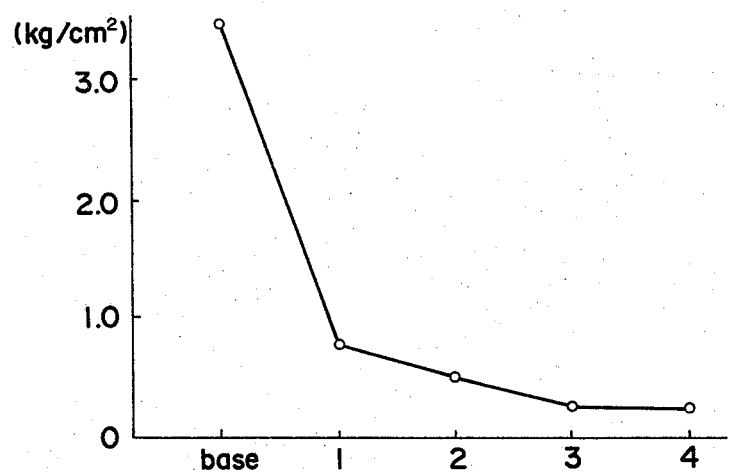
FIGS. 3 and 4 are graphs of comparing the adherence forces between the comparison product and the invented products in Examples 3 and 4 of the second embodiment of this invention.

The rust-forming tests were performed on the specimens in accordance with JASO C444-74 "The Rust-Forming Test Method". The test results are indicated in FIG. 3.

From the test results, it is observed that the No. 1-4 specimens of the second embodiment were conspicuously effective in preventing adherence in comparison with the basic specimen.

EXAMPLE 4

Figure 4:
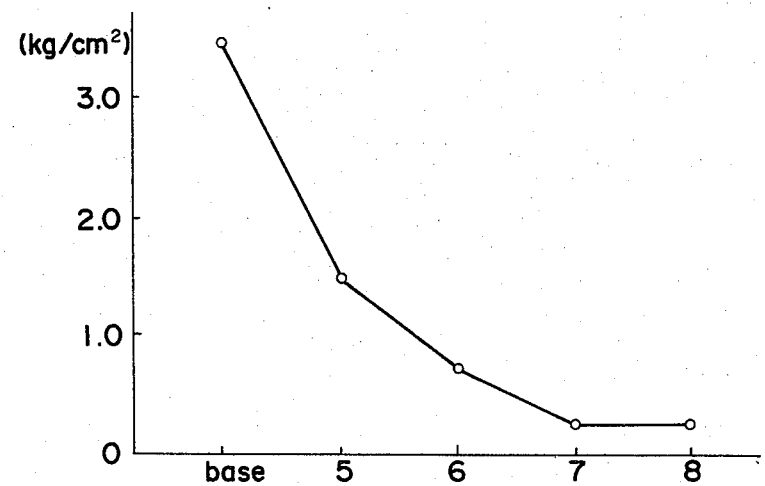

As for the basic composition of the Example 3 and No. 5-8 specimen compositions being added with 0.05, 3, 6 and 9 wt.% of phosphoric acid (phosphate), respectively to the basic composition, the specimens were made in the same manner as in the Example 3. The rust-forming tests were performed according to the same test standard and the test results were obtained as indicated in FIG. 4, showing the same effect as that of the Example 3 in connection with the preventing of adherence.

What is claimed is:

1. In a non-asbestos friction material comprising 5-60 wt.% of ferrous metal particle and/or ferrous metal fiber, 0.5-15 wt.% of organic dust selected from the group consisting of cashew dust and rubber dust, 2-20 wt.% of inorganic substance powder selected from the group consisting of barium sulfate, calcium sulfate, calcium silicate and calcium carbonate, 5-25 wt.% of lubricant selected from the group consisting of graphite and molybdenum disulfide, 0-20 wt.% of metal powder selected from the group consisting of copper, brass and aluminum, 0-20 wt.% of fibrous reinforcement material comprising at least one material selected from the group consisting of organic and inorganic fibers other than ferrous metal fibers, and 3-15 wt.% of thermosetting resin binder selected from the group consisting of phenol, melamine and epoxide, the friction material is characterized in containing at least 0.01 wt.% of at least one material selected from the group consisting of boric acid, borate, phosphoric acid and phosphate as an anticorrosive component.

2. In a non-asbestos friction material containing rubber dust, or rubber binder comprising 0.5-20 wt.% of organic friction dust, 5-60 wt.% of inorganic powder, 0-10 wt.% of lubricant, 0-30 wt.% of non-ferrous metal powder and/or non-ferrous metal fiber, 5-60 wt.% of fibrous reinforcement material comprising at least one material selected from the group consisting of organic and inorganic fibers other than said non-ferrous metal fiber, 0-20 wt.% of thermosetting resin binder selected from the groups consisting of phenol, melamine and epoxide, and other friction modifier, and containing no ferrous component, the friction material is characterized in containing at least 0.01 wt.% of at least one material selected from the group consisting of boric acid, borate, phosphoric acid and phosphate as an anticorrosive component.

* * * * *